United States Patent [19]

Mawatari et al.

[11] Patent Number: 4,839,425

[45] Date of Patent: Jun. 13, 1989

[54] THERMOPLASTIC RESIN COMPOSITION COMPRISING A POLYPHENYLENE ETHER AND A POLYAMIDE

[75] Inventors: Masaaki Mawatari, Suzuka; Tetsuo Itoh, Matsuzaka; Syuji Tsuchikawa; Shinichi Kimura, both of Yokkaichi, all of Japan

[73] Assignee: Japan Synthetic Rubber Co., Ltd., Tokyo, Japan

[21] Appl. No.: 31,579

[22] Filed: Mar. 30, 1987

[30] Foreign Application Priority Data

Mar. 28, 1986 [JP] Japan .................................. 61-70579

[51] Int. Cl.$^4$ ...................... C08L 53/00; C08F 283/08
[52] U.S. Cl. ......................................... 525/92; 525/66; 525/132; 525/179; 525/183; 525/184; 525/391; 525/392; 525/397; 525/905
[58] Field of Search ................... 525/92, 66, 132, 179, 525/183, 184, 391, 392, 397, 905

[56] References Cited

U.S. PATENT DOCUMENTS 4,339,376 7/1982 Kasahara et al. .................. 524/116

FOREIGN PATENT DOCUMENTS

| 0024120 | 2/1981 | European Pat. Off. |
| 49753 | 5/1981 | Japan . |
| 0059724 | 4/1984 | Japan . |
| 0066452 | 4/1984 | Japan . |

OTHER PUBLICATIONS

Patent Abstracts of Japan, vol. 8, No. 168, Aug. 3, 1984, "Resin Composition".

*Primary Examiner*—Lewis T. Jacobs
*Assistant Examiner*—A. Carrillo
*Attorney, Agent, or Firm*—Oblon, Fisher, Spivak, McClelland & Maier

[57] ABSTRACT

A thermoplastic resin composition obtained by melt-mixing:
(a) 4 to 95% by weight of a polyphenylene ether resin,
(b) 4 to 95% by weight of a polyamide,
(c) 1 to 50% by weight of a rubbery polymer, and
(d) if necessary, 91% by weight or less of a styrene resin (d)

[the sum of the (a), (b), (c) and (d) components is 100% by weight] in the presence of 0.001 to 10% by weight, based on the total weight of the (a), (b), (c) and (d) components, of at least one functional group-containing unsaturated compound having at least one group selected from the class consisting of carboxyl group, acid anhydride group, epoxy group, hydroxyl group, amino group and amido group and 0.001 to 5% by weight, based on the total weight of the (a), (b), (c) and (d) components, of a peroxide. This thermoplastic resin composition is excellent in balance of impact strength of thin molded product, moldability and heat resistance. Therefore, the composition can be used as molded products such as external and internal trim parts of automobiles, electric and electronic components, housings and the like, requiring a high quality, and accordingly is highly valuable in industrial utilization.

22 Claims, No Drawings

THERMOPLASTIC RESIN COMPOSITION COMPRISING A POLYPHENYLENE ETHER AND A POLYAMIDE

This invention relates to a thermoplastic resin composition having excellent processability, impact resistance and heat resistance.

Polyphenylene ether resins are excellent in mechanical properties, electrical properties and heat resistance. In addition, they have such properties that the dimensional stability is good, and the like. Therefore, they have drawn attention as a resin suitable for use in wide applications. However, they are disadvantageous in that they are poor in moldability and impact resistance.

In order to improve the moldability of polyphenylene ether resins, incorporating a polyamide into the resin is proposed in Japanese Patent Publication No. 997/70. However, the polyphenylene ether resin and the polyamide are very poor in compatibility with each other; accordingly, the resulting resin composition is inferior in mechanical characteristics (the mechanical characteristics are remarkably inferior particularly when the polyamide content in the resin composition exceeds 20%) and the molded products obtained by the injection molding of the resin composition have had very low impact resistance.

In order to improve the impact resistance of the above resin composition, an elastomer component, namely, an ethylene-propylene copolymer or a styrene-butadiene-styrene block copolymer has been added thereto (Japanese Patent Application Nos. 270,281/85, 270,315/85 and 270,318/85). However, little improvement was obtained in impact resistance.

It has later been found that the impact resistance of said resin composition can be improved by substituting therefor an ethylene-propylene copolymer modified with maleic anhydride or the like. The product obtained thereby has, however, been in some cases somewhat inferior in balance of impact resistance (especially falling dart impact strength of thin molded product produced therefrom) and moldability.

The present inventors have made extensive research in order to develop a resin composition which is excellent in impact strength of thin molded product, processability and heat resistance and which can be used in wide application. As a result, it has been found that a novel thermoplastic resin composition having performance, which conventional resin compositions have not had, can be obtained by producing a composition composed of a polyphenylene ether resin, a polyamide and a rubbery polymer, in the presence of an unsaturated compound having a specific functional group and a peroxide.

According to this invention, there is provided a thermoplastic resin composition obtained by melting and mixing (a) 4 to 95% by weight of a polyphenylene ether resin,
(b) 4 to 95% by weight of a polyamide,
(c) 1 to 50% by weight of a rubbery polymer, and
(d) if necessary, 91% by weight or less of a styrene resin [the sum of the (a), (b), (c) and (d) components is 100% by weight] in the presence of 0.001 to 10% by weight, based on the total weight of the (a), (b), (c) and (d) components, of at least one functional group-containing unsaturated compound having at least oen group selected from the class consistig of carboxyl group, acid anhydride group, epoxy group, hydroxyl group, amino group and amido group and of 0.001 to 5% by weight, based on the total weight of the (a), (b), (c) and (d) components, of a peroxide.

The polyphenylene ether resin (a) used in this invention is a polymer represented by the formula:

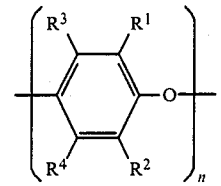

wherein $R^1$, $R^2$, $R^3$ and $R^4$, which may be the same or different, represent alkyl groups, aryl groups, halogen atoms or hydrogen atoms and n is degree of polymerization. Specific examples of the (a) component include homopolymers and copolymers of 2,6-dimethylphenylene-1,4-ether, 2,3,6-trimethylphenylene-1,4-ether, 2,6-diethylphenylene-1,4-ether, 2,6-dibromophenylene-1,4-ether, 2-methyl-6-ethylphenylene-1,4-ether, 2-chloro-6-methylphenylene-1,4-ether, 2-methyl-6-isopropylphenylene-1,4-ether, 2,6-di-n-propylphenylene-1,4-ether, 2,6-di-n-propylphenylene-1,4-ether, 2-chloro-6-bromophenylene-1,4-ether, 2-chloro-6-ethylphenylene-1,4-ether, 2-methylphenylene-1,4-ether, 2-chlorophenylene-1,4-ether, 2-phenylphenylene-1,4-ether, 2-methyl-6-phenylphenylene-1,4-ether, 2-bromo-6-phenylphenylene-1,4-ether, 2,4'-methylphenylphenylene-1,4-ether, etc., as well as styrene compound-grafted copolymers thereof.

The amount of the polyphenylene ether resin in the thermoplastic resin composition of this invention is 4 to 95% by weight, preferably 5 to 60% by weight, and more preferably 5 to 50% by weight, based on the total weight of the components (a), (b), (c) and (d) (hereinafter, this is referred to as the total weight of the polymeric components).

When the amount of the polyphenylene ether resin is less than 4% by weight, the improvement in heat resistance is not sufficient, while when the amount exceeds 95% by weight, the processability becomes unsatisfactory.

The polyamide used as the (b) component in this invention includes condensation products obtained by condensing a linear diamine represented by the formula:

$$H_2N-(CH_2)_x-NH_2$$

wherein x is an integer of 4 to 12 and a linear dicarboxylic acid represented by the formula:

$$HO_2C-(CH_2)_y-CO_2H$$

wherein y is an integer of 2 to 12; ring-opening polymerization products of lactam; and the like. Preferable examples of these polyamides are nylon 6,6, nylong 6,9, nylon 6,10, nylon 6,12, nylon 6, nylon 12, nylon 11 and nylon 4,6.

As the polyamide (b), there can further be used copolymer polyamides such as nylon 6/6,6, nylon 6/6,10, nylon 6/12, nylon 6/6,12, nylon 6/6,6/6,10, nylon 6/6,6/12 and the like.

Furthermore, there may be used nylon 6/6,T in which T isa terephthalic acid component; semi-aromatic polyamides obtained from an aromatic dicarboxylic acid such as terephthalic acid, isophthalic acid or the like and meta-xylenediamine or an alicyclic diamine; polyamides obtained from m-xylenediamine and the above-mentioned linear dicarboxylic acid; polyesteramides; polyetheramides; and polyesteretheramides. These polyamides may be used alone or in combination of two or more.

The amount of the (b) component used is 4 to 95% by weight, preferably 40 to 90% by weight, and more preferably 50 to 90% by weight, based on the total weight of the polymeric components. When the amount of the (b) component used is less than 4% by weight, the improvement in processability is not sufficient, while when the amount exceeds 95% by weight, the improvement in heat resistance is adversely affected.

The rubbery polymer (c) used in the composition of this invention includes rubbery polymers such as polybutadiene, styrene-butadiene random copolymer (the styrene content is preferably 5 to 60% by weight), styreneisoprene copolymer, acrylonitrile-butadiene copolymer, ethylene-alpha-olefin copolymer, ethylene-alpha-olefin-polyene copolymer, acrylic rubber, polyisoprene and the like; and thermoplastic elastomers such as styrene-butadiene block copolymer, a styrene-isoprene block copolymer, hydrogenated styrene-butadiene block copolymer, styrene-grafted ethylene-propylene elastomer, ethylenic ionomer resins and the like.

The styrene-butadiene block copolymer and the styrene-isoprene block copolymer include those having structures of the AB type, the ABA type, the ABA taper type and the radial block type.

The above-mentioned rubbery polymers and thermoplastic elastomers may be used alone or in admixture of two or more.

The rubbery polymer (c) may be modified with a functional group such as carboxyl group, acid anhydride group, epoxy group, hydroxyl group, amino group or the like.

From the standpoint of impact resistance, preferable rubbery polymers (c) are polybutadiene, styrene-butadiene copolymer, ethylene-alpha-olefin copolymer, styrene-butadiene block copolymer, etc. More preferable are styrene-butadiene copolymer, ethylene-alpha-olefin copolymer, styrene-butadiene block copolymer, etc.

The ethylene/alpha-olefin weight ratio in the ethylene-alpha-olefin copolymer used as the rubber polymer (c) is 95/5 to 5/95, preferably 95/5 to 20/80, more preferably 92/8 to 60/40, and most preferably 85/15 to 70/30. When the ethylene/alpha-olefin weight ratio is in a range of 80/20 to 75/25, the impact resistance is particularly high.

The Mooney viscosity ($ML_{1+4, 100° C.}$) of the ethylene-alpha-olefin copolymer is 5 to 200, preferably 5 to 100, more preferably 5 to 50 from the standpoint of impact resistance. The impact resistance is particularly high when the Mooney viscosity is in a range of 10 to 30.

The cyclohexane-insoluble content of the ethylene-alpha-olefin copolymer affects the processability and impact resistance of the thermoplastic resin composition of this invention, and is usually 50% by weight or less, preferably 5% by weight or less. The alpha-olefin used in this copolymer is an unsaturated hydrocarbon compound having 3 to 20 carbon atoms, and includes specifically propylene, butene-1, pentene-1, hexene-1, heptene-1, 4-methylbutene-1, 4-methylpentene-1, etc. Of these, propylene is particularly preferable.

The (c) component is used in an amount of 1 to 50% by weight, preferably 2 to 30% by weight, and more preferably 5 to 25% by weight, based on the total weight of the polymeric components. When the amount is less than 1% by weight, no improvement in impact resistance is seen, and when the amount exceeds 50% by weight, there is a fear that the processability may be adversely affected.

The styrene resin used as the (d) component in the comoosition of this invention includes polymers consisting of an alkenyl compound, and copolymers consisting of an aromatic alkenyl compound and another alkenyl compound copolymerizable therewith.

The aromatic alkenyl compound includes styrene, alpha-methylstyrene, o-, m- or p-methylstyrene, vinylxylene, monochlorostyrene, dichlorostyrene, monobromostyrene, dibromostyrene, p-tert-butylstyrene, ethylstyrene, etc. These compounds may be used alone or in admixture of two or more. Styrene is particularly preferable.

The alkenyl compound copolymerizable with the aromatic alkenyl compound includes alkenyl cynaide compounds such as acrylonitrile, methacrylonitrile and the like; alkyl acrylates such as methyl acrylate, ethyl acrylate, butyl acrylate, 2-ethylhexyl acrylate and the like; alkyl methacrylates such as methyl methacrylate, ethyl methacrylate, 2-ethylhexyl methacrylate and the like; maleimide compounds such as maleimide, N-phenylmaleimide, N-cyclohexylmaleimide and the like; unsaturated acids such as acrylic acid, methacrylic acid, itaconic acid, maleic acid, crotonic acid, cinnamic acid and the like; unsaturated carboxylic anhydrides such as maleic anhydride, itaconic anhydride, chloromaleic anhydride, citraconic anhydride, butenylsuccinic anhydride, tetrahydrophthalic anhydride and the like; epoxy group-containing ethylenically unsaturated compounds such as glycidyl acrylate, glycidyl methacrylate, allyl glycidyl ether, 2-methylallyl glycidyl ether, 2-methylallyl glycidyl ether, styrene-p-glycidyl ether, 3,4-epoxybutene, 3,4-epoxy-3-methyl-1-butene, 3,4-epoxy-1-pentene, 3,4-epoxy-3-methylpentene, 5,6-epoxy-1-hexene, vinylcyclohexene monooxide, p-glycidylstyrene and the like; amino group-containing ethylenically unsaturated compounds such as allylamine, aminoethyl methacrylate, aminostyrene and the like; and hydroxyl group-containing unsaturated compounds such as 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, cis-1,4-hydroxy-2-butene, trans-1,4-hydroxy-2-butene, 2-hydroxyethyl acrylate, 2-hydroxyethyl methacrylate, 3-hydroxypropyl acrylate, 3-hydroxypropyl methacrylate, 2-hydroxyethyl crotonate, 2,3,4,5,6-pentahydroxyhexyl acrylate, 2,3,4,5,6-pentahydroxyhexyl methacrylate, 2,3,4,5-tetrahyrdoxypentyl acrylate, 2,3,4,5-tetrahydroxypentyl methacrylate and the like. These other alkenyl compounds copolymerizable with the aromatic alkenyl compounds may be used alone or in admixture of two or more.

In the styrene resin (d), preferable combinations of the aromatic alkenyl compound with other alkenyl compound copolymerizable with the aromatic alkenyl compound are styrene-maleic anhydride copolymer, styrene-acrylic acid copolymer, styrene-methacrylic acid copolymer, styrene-glycidyl methacrylate copolymer, etc.

The styrene resin (d) of this invention also includes products obtained by polymerizing the aromatic alkenyl compounds in the presence of the above-mentioned rubbery polymer.

The amount of the styrene resin (d) used in the thermoplastic resin composition of this invention is 91% by weight or less, preferably 0.5 to 80% by weight, more preferably 1 to 50% by weight, based on the total weight of the polymeric components. When the amount exceeds 91% by weight, there is a fear that the heat resitance may be affected adversely.

The styrene resin (d) can be produced according to any known polymerization method such as emulsion polymerization, solution polymerization, bulk polymerization, suspension polymerization, bulk-solution polymerization, bulk-suspension polymerization or the like.

When producing the thermoplastic resin composition of this invention, it is necessary to melt-mix the (a), (b), (c) and (d) components in the presence of an unsaturated compound having a specific functional group and a peroxide in order to obtain a thermoplastic resin excellent in impact strength of thin molded product, processability and heat resistance aimed at in this invention.

The unsaturated compound having a specific functional group used in this invention is an ethylenically unsaturated compound having at least one functional group selected from the class consisting of carboxyl group, acid anhydride group, epoxy group, hydroxyl group, amino group and amido group.

The carboxyl group-containing unsaturated compound includes, for example, acrylic acid, methacrylic acid, crotonic acid, cinnamic acid, itaconic acid and maleic acid. Acrylic acid and methacrylic acid are preferred. These compounds may be used alone or in admixture of two or more.

The acid anhydride group-containing unsaturated compound includes maleic anhydride, itaconic anhydride, chloromaleic anhydride, citraconic anhydride, butenyl-succinic anhydride, tetrahydrophthalic anhydride, etc. Maliec anhydride is particularly preferred. These compounds may be used alone or in admixture of two or more.

The epoxy group-containing unsaturated compound is a compound having, in the molecule, an epoxy group and an unsaturation which is copolymerizable with an olefin or ethylenically unsaturated compound.

The epoxy group-containing unsaturated compounds include, for example, unsaturated glycidyl esters, unsaturated glycidyl ethers, epoxyalkylenes, p-glycidyl-styrenes and the like as represented by the following formulas (III), (IV) and (V):

$$R^5-\overset{\overset{O}{\|}}{C}-O-CH_2-CH\underset{O}{\overset{}{\diagdown}}CH_2 \quad (III)$$

wherein $R^5$ is a $C_{2-18}$ hydrocarbon group having an ethylenic unsaturation.

$$R^5-X-CH_2-CH\underset{O}{\overset{}{\diagdown}}CH_2 \quad (IV)$$

wherein $R^5$ is a $C_{2-18}$ hydrocarbon group having an ethylenic unsaturation, and X is

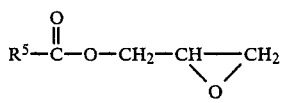

or

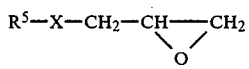

and

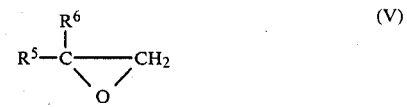

wherein $R^5$ is a $C_{2-18}$ hydrocarbon group having an ethylenic unsaturation, and $R^6$ is a hydrogen atom or a methyl group.

Specific examples of the epoxy group-containing unsaturated compound include glycidyl acrylate, glycidyl methacrylate, glycidyl itaconate, glycidyl butenate, allyl glycidyl ether, 2-methyallyl glycidyl ether, styrene-p-glycidyl ether, 3,4-epoxybutene, 3,4-epoxy-3-methyl-1-butene, 3,4-epoxy-1-pentene, 3,4-epoxy-3-methylpentene, 5,6-epoxy-1-hexene, vinylcyclohexene monooxide, p-glycidylstyrene, etc. These compounds may be used alone or in admixture of two or more.

The hydroxyl group-containing unsaturated compound is a compound having at least one unsaturation (double or triple bond) and at least one hydroxyl group. Typical examples of the compound are alcohols having a double bond, alcohols having a triple bond, esters of an unsaturated mono- or dicarboxylic acid with an unsubstituted dihydric alcohol, esters of said unsaturated carboxylic acid with an unsubstituted trihydric alcohol, esters of said unsaturated carboxylic acid with an unsubstituted tetrahydric alcohol and esters of said unsaturated carboxylic acid with an unsubstituted pentahydric or more hydric alcohol.

As the hydroxyl group-containing unsaturated compound, preferred are 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, cis-1,4-dihydroxy-2-butene, trans-1,4-dihydroxy-2-butene, 2-hydroxyethyl acrylate, 2-hydroxyethyl methacrylate, 3-hydroxypropyl acrylate, 3-hydroxypropyl methacrylate, 2-hydroxyethyl crotonate, 2,3,4,5,6-pentahydroxyhexyl acrylate, 2,3,4,5,6-pentahydroxyhexyl methacrylate, 2,3,4,5-tetrahydroxypentyl acrylate and 2,3,4,5-pentahydroxypentyl methacrylate.

These compounds may be used alone or in admixture of two or more.

The amino or amido group-containing unsaturated compound is an alkenyl compound having at least one group selected from the amino, substituted amino, amido and substituted amido groups represented by the formula:

wherein $R^7$ is a hydrogen atom, a methyl group or an ethyl group; and $R^8$ is a hydrogen atom, an alkyl group having 1 to 12 carbon atoms, an alkanoyl group having 2 to 12 carbon atoms, an aryl group having 6 to 12 carbon atoms, a cycloalkyl group having 6 to 12 carbon atoms or a derivative group thereof. Specific examples include derivatives of alkyl acrylates and methacrylates such as aminoethyl acrylate, propylaminoethyl acrylate, dimethylaminoethyl methacrylate, aminopropyl methacrylate, phenylaminoethyl methacrylate, cyclohexylaminoethyl methacrylate and the like; vinylamine derivates such as N-vinyldiethylamine, N-acetylvinylamine and the like; allylamine or its derivatives such as methallyamine, N-methylallylamine and the like; acrylamide or its derivatives such as methacrylamide, N-methylacrylamide and the like; and aminostyrenes such as p-aminostyrene and the like. Of these, allylamine, aminoethyl methacrylate, aminopropyl methacrylate, p-aminostyrene, etc. are particularly preferred because they are available on a commercial scale. These unsaturated compounds having at least one group selected from the amino, substituted amino, amido and substituted amido groups may be used alone or in admixture of two or more.

The above-mentioned unsaturated compounds having functional groups may be used alone or in admixture of two or more. Among them, preferred are those having a carboxyl grouop and/or an acid anhydride group. Particularly preferred are those having an acid anhydride group, namely, unsaturated carboxylic anhydrides. The particularly preferred example of the unsaturated carboxylic anhydrides is maleic anhydride.

The amount of the unsaturated compound having a functional group used is 0.001 to 10% by weight, preferably 0.005 to 5% by weight, and more preferably 0.01 to 1% by weight, based on the total weight of the polymeric components [the (a), (b), (c) and (d) components]. When the amount is more or less than the above range, the impact strength becomes unsatisfactory.

As the peroxide, any known organic peroxide may be used. Specific examples include 2,5-dimethyl-2,5-di(tert-butylperoxy)hexyne-3, 2,5-dimethyl-2,5-di(tert-butylperoxy)hexane, 2,2'-bis(tert-butylperoxy)-p-diisopropylbenzenedicumyl peroxide, di-tert-butyl peroxide, tert-butyl peroxybenzoate, 1,1-bis(tertbutylperoxy)-3,3,5-trimethylcyclohexane, 2,4-dichlorobenzoyl peroxide, benzoyl peroxide, p-chlorobenzoyl peroxide, and the like. Of these, preferred are 2,5-dimethyl-2,5-di(tert-butylperoxy)hexane and 2,5-dimethyl-2,5-di(tert-butylperoxy)hexyne-3.

The amount of the organic peroxide used is 0.001 to 5% by weight, preferably 0.005 to 2% by weight, and more preferably 0.005 to 1% by weight, based on the total weight of the polymeric components. When the amount is more or less than the above range,the impact strength becomes unsatisfactory.

When producing the thermoplastic resin composition of this invention, a known antioxidant may, if desired, be added.

The production of the thermoplastic resin composition of this invention can be conducted by melt-mixing the necessary components at a temperature ranging from 200° to 350° C., preferably from 230° to 330° C., and more preferably from 260° to 330° C. by means of an extruder, a Banbury mixer, a kneader, a roll or t he like. Preferably an extruder, particularly preferably a twin-screw extruder is used.

When producing the thermoplastic resin composition of this invention, the polymeric components may be added together at one time, or in several portions or separately in multi-step.

Preferable methods of adding the polymeric components are as follows:

(1) The (a) and (c) components and optionally the (d) component, the unsaturated compound having a functional group and the peroxide are melt-mixejd, and then the (b) component is added thereto.

(2) The (a) and (c) components, the unsaturated compound having a functional group and the peroxide are melt-mixed, and then, the (b) component and optionally the (d) component are added thereto.

When a multi-step addition method is employed, a desirable result is obtained by rendering and kneading conditions in the second and later steps severer than in the first step.

It is desirable that at least one component of the (a), (b) and (c) components be dispersed in the composition of this invention.

Depending upon the proportions of the (a), (b), (c) and (d) components, the resin composition may have one of the following dispersion forms: (1) a dispersion wherein the (c) component is contained in the (a) component particles which are dispersed in the (b) component, (2) a dispersion wherein the (c) component is contained in the (b) component particles which are dispersed in the (a) component, (3) a dispersion wherein the (c) component and the (a) component are independently dispersed in the (b) component, (4) a dispersion wherein the (c) component and the (b) component are independently dispersed in the (a) component, (5) a dispersion wherein a part of the (c) component is contained in a part of the (a) component particles which are, together with particles of the remainder of the (c) component and the remaining particles of the (a) component, dispersed independently in the (b) component and (6) a dispersion wherein a part of the (c) component is contained in a part of the (b) component particles which are, together with particles of the remainder of the (c) component and the remaining particles of the (b) component, dispersed independently in the (a) component. Any of the dispersion forms may be used though forms (1), (3) and (5) are preferred. The weight-average diameter of dispersoid particles is preferably 5 $\mu$m or less, more preferably 3 $\mu$m or less, and most preferably 0.1 to 2 $\mu$m, from the standpoint of the impact strength. These forms as well as the dispersoid particles can be observed by means of an electron microscope.

To the thermoplastic resin composition of this invention, there may be added fillers such as glass fiber, carbon fiber, metal fiber, glass beads, asbestos, wollastonite, calcium carbonate, talc, barium sulfate and the like alone or in combination. It is preferable that the glass fiber and the carbon fiber have a diameter of 6 to 60 $\mu$m and a length of 30 $\mu$m or more.

These fillers are preferably contained in an amount of 5 to 150 parts by weight per 100 parts by weight of the thermoplastic resin composition.

To the present thermoplastic resin composition may be added known additives such as a flame retardant, an antioxidant, a plasticizer, a coloring agent, a lubricant and the like. As the flame retardant and the antioxidant, preferred are those of phosphorous type.

Depending upon the applications of the present thermoplastic resin composition, there may, if desired, be incorporated thereinto other polymers such as polyethylene, polypropylene, polysulfone, polyethersulfone, polyimide, polyphenylene sulfide, polyetheretherketone, vinylidene fluoride polymer and the like.

The thermoplastic resin composition of this invention can be formed into various molded products by injection molding, sheet-extrusion molding, vacuum molding, profile molding, foam molding, etc.

These molded products, owing to their excellent properties, can be used external and internal trim parts of automobiles, electrical and electronic parts, housings, etc.

This invention will be explained in more detail below referring to Examples, Comparative Examples and Preparation Examples. However, the Examples are merely by way of illustration and not by way of limitation.

In the following Examples, Comparative Examples and Preparation Examples, part and % are by weight unless otherwise specified.

PREPARATION EXAMPLE 1

The polyphenylene ethers used in Examples and Comparative Examples were prepared as follows:

(1) Preparation of Polymer A-1 (polyphenylene ether)

A stainless steel reactor provided with an oxygen-blowing means at the bottom, a cooling coil and a stirrer was thoroughly purged with nitrogen, and into the reactor were charged 53.6 g of cupric bromide, 1,110 g of di-n-butylamine and a solution of 8.75 g of 2,6-xylenol in 40 liters of toluene. The resulting mixtures was stirred to form a solution, and the solution was subjected to polymerization for 90 minutes while rapidly blowing oxygen at a high rate into the reactor, during which the internal temperature of the reactor was maintained at 30° C. by circulating water into the cooling coil. After the completion of the reaction, 30 liters of toluene was added to the reaction mixture, and then 20% by weight aqueous solution of 430 g of trisodium ethylenediamine-tetraacetate was added thereto to terminate the polymerization.

The polymerization mixture was subjected to centrifugation to separate the polymer solution phase. To the polymer solution phase was gradually added methanol while vigorously stirring the polymer solution phase to form a slurry. The slurry was filtered and the polymer thus obtained was thoroughly washed with methanol and then filtered and dried to obtain a polymer (Polymer A-1).

The Polymer A-1 had an intrinsic viscosity [$\tau$] of 0.40 as measured at 30° C. in chloroform as a solvent.

(2) Preparation of Polymer A-2 (polyphenylene ether)

The same procedure as in the preparation of Polymer A-1 was repeated, except that the 2,6-xylenol was replaced by a mixture of 2,6-xylenol/2,3,6-trimethylphenol (90/10 by mole) to prepare a polymer (Polymer A-2). Polymer A-2 had an intrinsic viscosity [$\tau$] of 0.4 as measured in the same manner as in the case of Polymer A-1.

PREPARATION EXAMPLE 2

The [d] component used in Examples and Comparative Examples was prepared as follows:

(1) Preparation of Polymer D-1 (styrene-glycidyl methacrylate copolymer)

A stainless steel reactor equipped with a stirrer was purged with nitrogen. In the reactor were placed, under a nitrogen stream, 45 parts of styrene, 5 parts of glycidyl methacrylate, 0.43 part of tert-dodecylmercaptan, 1.0 part of sodium dodecylbenzenesulfonate and 140 parts of deionized water. While circulating hot water at 70° C. in the jacket of the reactor, there are further added thereto an aqueous solution of 0.1 part of sodium ethylenediaminetetraacetate, 0.003 part of ferrous sulfate, 0.2 part of formaldehyde-sodium sulfoxylate dihydrate and 15 parts of deionized water and 0.3 part of cumene hydroperoxide. Thereafter, polymerization reaction was effected for 2 hours. Subsequently, 45 parts of styrene, 5 parts of glycidyl methacrylate, 0.43 part of tertdodecylmercaptan, 1.0 part of sodium dodecylbenzenesulfonate, 90 parts of deionized water and 0.3 part of cumene hydroperoxide were added, and the polymerization reaction was effected for a further 3 hours. To the resulting polymer latex was added an aqueous calcium chloride solution to coagulate the talex, and the polymer obtained was then washed, dehydrated and dried to obtain a polymer (Polymer D-1).

(2) Polymer D-2

Dylark ® 232, a styrene-maleic anhydride copolymer, produced by Arco Polymer.

(3) Polymer D-3

(a) Preparation of butadiene-n-butyl acrylate copolymer rubber latex

A stainless steel reactor equipped with 4-stage paddle-shaped blades was thoroughly purged with nitrogen, and thereinto were charged 50 parts of 1,3-butadiene, 50 parts of n-butyl acrylate, 75 parts of ion-exchanged water, 1.0 part of potassium laurate, 0.2 part of potassium stearate, 0.1 part of sodium naphthalenesulfonate, 0.12 part of potassium hydroxide, 1.5 part of potassium chloride, 0.2 part of tertiary dodecylmercaptan and 0.25 part of potassium persulfate, after which the reaction was initiated by stirring the resulting mixture at 200 rpm and circulating warm water at 55° C. in the jacket. The temperature was elevated to 60° C. after 15 hours from the initiation, 65° C. after 20 hours therefrom and 70° C. after 25 hours therefrom. The mixture underwent polymerization for 60 hours in total after the initiation of the polymerization, and thereafter, the polymerization was terminated by adding 0.1 part of diethylhydroxyamine, after which the unreacted monomers were substantially removed by steam distillation to obtain a rubbery polymer latex. The average particle diameter of the latex was 2,800 Å as measured using Nanosizer (product of Nikkaki).

(b) Preparation of Polymer D-3

A stainless steel reactor was thoroughly purged with nitrogen, and thereinto were charged 40 parts (as solids) of the rubbery polymer latex obtained in (a) abaove, 0.25 prt of sodium dodecylbenzenesulfonate, 0.03 part of potassium hydroxide, 100 part of ion-exchanged water and 25 parts of styrene. Subsequently, 0.3 part of cumene hydroperoxide and an aqueous solution consisting of 0.2 part of sodium pyrophosphate, 0.25 part of grape sugar, 0.004 part of ferrous sulfate and 10 parts of ion-exchanged water were added to the resulting mixture at an internal temperature of 60° C. while circulating warm water at 75° C. in the jacket, and the resulting mixture was subjected to polymerization for one hour. Subsequently, the polymerization was effected while continuously adding 0.25 part of cumene hydroperoxide and an emulsion consisting of 35 parts of styrene, 0.5 part of sodium dodecylbenzenesulfonate, 0.03 part of potassium hydroxide and 50 parts of ion-exchanged water to the polymerization mixture over 4 hours. Subsequently, 0.05 part of cumene hydroperoxide and an aqueous solution consisting of 0.07 part of sodium pyrophosphate, 0.08 part of grape sugar, 0.001 part of ferrous sulfate and 3 parts of ion-exchanged water were added to the polymerization mixture to effect the polymerization for a further one hour. After the completion of the polymerization, the polymerization mixture was cooled, and an anti-oxidant was added thereto. Potassium chloride was added to the mixture to coagulate the same and the resulting coagulum was washed with water, dehydrated and then dried to obtain a polymer (Polymer D-3).

(4) Polymer D-4

A stainless steel reactor equipped with stirring blades of the paddle shape was purged with nitrogen, and thereinto were charged 30 parts of a rubbery polymer (JSR EP-24) having an iondine value of 15, a Mooney viscosity of 65 and a propylene content of 43% and containing 5-ethylidene-2-norbornene as polyene, 70 parts of styrene and 110 parts of toluen, after which the resulting mixture was thoroughly stirred at 50° C. until the rubbery polymer was completely dissolved. Thereafter, 0.1 part of tertiary dodecylmercaptan, 0.2 part of dibenzoyl peroxide, 0.2 part of tertiary butyl peroxy-1-propylcarbonate and 0.1 part of dicumyl peroxide were added to the resulting solution and the temperature was elevated while stirring the solution at 100 rpm, during which the solution was subjected to polymerization at 80° C. for 3 hours, at 100° C. for 3 hours and at 125° C. for 3 hours until the polymerization conversion reached substantially 100%. The unreacted monomers and the solvent were removed by steam distillation, and the residue thus obtained was then ground, dried and pelletized by means of an extruder provided with a vent to obtain a polymer (Polymer D-4).

(5) Polymer D-5

Polystyrene (TOPOREX® 565 of Mitsui-Toatsu Chemicals Inc.) was used.

PREPARATION EXAMPLE 3

Ethylene-propylene rubbers modified with maleic anhydride, which were used in Comparative Examples, were prepared as follows:

Polymer C-1

100 Parts of an ethylene-propylene rubber (JSR EP-02P, a product of Japan Synthetic Rubber Co., Ltd., Mooney viscosity$_{1+4, 100°}$ C.: 24), 1 part of maleic anhydride and 0.3 part of an organic peroxide (Kayahexa AD, a product of Kayaku Noury Co., Ltd.) were premixed. The mixture was subjected to a heat treatment using a single-screw extruder (55 mm in diameter, full-flighted screw) at 200° C., at a screw revolution speed of 30 rpm for a residence period of 4 minutes. The resulting polymer (Polymer C-1) was molded into a film and subjected to measurement of amount of maleic anhydride grafted according to infrared spectroscopy. The amount of maleic anhydride grafted was determined as 0.5 part by weight per 100 parts by weight of the ethylene-propylene copolymer.

Polymer C-2

The same procedure as in the preparation of Polymer C-1 was repeated, except that the amount of maleic anhydride added was changed to 5 parts to obtain a polymer (Polymer C-2) in which the amount of maleic anhydride grafted was 2.0 parts by weight per 100 parts by weight of the ethylene-propylene copolymer.

In Examples and Comparative Examples, the following polymers were used as the (b) and (c) components:

Components (b)

Polymer B-1: Nylon 6,6 (Amilan® CM3006, a product of TORAY INDUSTRIES, INC.)
Polymer B-2: Nylon 4,6 (Polyamide prepared from tetramethylenediamine and adipic acid (1/1 by mole) in accordance with the process of U.S. Pat. No. 4,463,166, having a relative viscosity of 3.5 as measured at 30° C. in solution of 1 g of the polymer in 100 ml of 97% sulfuric acid.)

Components (c)

Polymer C-3: JSR ED-02P, a product of Japan Synthetic Rubber Co., Ltd.
Polymer C-4: JSR TR-2000, a product of Japan Synthetic Rubber Co., Ltd. (a styrene-butadiene-styrene block copolymer having a styrene content of 40% by weight).

Examples 1 to 33 and Comparative Examples 1 to 11

The above-mentioned polymers were mixed in the proportions shown in Table 1. In Table 1, for example, "A-1 (1)" means that the component A-1 was added in the 1st step, and, for example, "B-1 (2)" means that the component B-1 was added in the 2nd step. In mixing, a twin-screw extruder (PCM-45, a product of Ikegai Corp.) was used. In the extruder, a severe kneading zone was provided between the addition in the 1st step and the addition in the 2nd step, and a further severer kneading zone was provided after the addition in the 2nd step; whereby the mixture was pelletized. The highest barrel temperature of the extruder was set at 320° C. and the screw revolution was set at 300 rpm.

Each thermoplastic resin composition obtained in the pellet form was thoroughly dried in a vacuum drier and then subjected to injection molding to prepare test samples. These test samples were subjected to measurement of impact strength and heat resistance. The pellets after drying were used to evaluate processability. The evaluation results are shown in Table 1.

In Table 1, the amounts of the unsaturated compounds and the peroxide used are based on the total weight of the polymeric components [the (a), (b), (c) and (d) components]. The peroxide used was Kayahexa AD mentioned above.

EVALUATION METHODS

Impact resistance

Izod impact strength: Measured in accordance with ASTM D 256 (thickness: ⅛", notched, 23° C.).
Falling dart impact strength: The falling dart impact strength of a molded product having a thickness of 1.6 mm was measured by means of a Du Pont type impact tester using a dart having a R of ½" at the front end.
Heat resistance: Measured according to ASTM D 648 (thickness: ½", load: 18.6 kg/cm$^2$).

Processability: Measured according to JIS K 7210 [280° C. (300° C. in Examples 18, 31, 32 and 33), load: 10 kg].

Measurement of diameter of dispersed particles: A cut sample of each resin composition was prepared, and the particle diameters of at least 500 particles were measured by means of a transmission electron microscope, from which a weight average particle diameter was determined.

Weight-average particle diameter
$$(\overline{R}) = (\Sigma n_i R_i^4 / \Sigma n_i R_i^3)$$

wherein $R_1$ is diameter of dispersed particles and $n_i$ is the number of dispersed particles having diameter $R_i$.

In Comparative Examples 1 and 2, ethylene-propylene copolymers modified with maleic anhydride were used. The compositions of these Comparative Examples are inferior to those of Examples 2 and 9 in falling dart impact strength of thin molded product.

As seen in Comparative Example 5, impact resistance decreases significantly when neither unsaturated compound nor peroxide are used.

TABLE 1

| | Proportions of starting polymers used (parts) | | | | | | | | | | Evaluation results | | | | Weight-average particle diameter (R) of dispersed particles (μm) |
|---|---|---|---|---|---|---|---|---|---|---|---|---|---|---|---|
| | Component (a) | | Component (b) | | Component (c) | | Component (d) | | Type and amount (%) of functional group-containing unsaturated compound used | Amount (%) of peroxide used | Izod impact strength (kg·cm/cm) | Falling dart impact strength (kg·cm) | Processability (g/10 min) | Heat resistance (°C.) | |
| | Type | Amount (part) | Type | Amount (part) | Type | Amount (part) | Type | Amount (part) | | | | | | | |
| Example | | | | | | | | | | | | | | | |
| 1 | A-1 (I)* | 27 | B-1 (2)* | 63 | C-3 (I)* | 8 | D-3 (I)* | 2 | Maleic anhydride | 0.08 | 0.04 | 35 | 320 | 102 | 148 | 0.8 |
| 2 | A-2 (I) | 27 | B-1 (2) | 63 | C-3 (I) | 8 | D-1 (I) | 2 | Maleic anhydride | 0.08 | 0.04 | 38 | 360 | 108 | 148 | 0.8 |
| 3 | A-2 (I) | 36 | B-1 (2) | 54 | C-3 (I) | 8 | D-1 (I) | 2 | Maleic anhydride | 0.08 | 0.04 | 28 | 280 | 85 | 165 | 0.8 |
| 4 | A-2 (I) | 18 | B-1 (2) | 72 | C-3 (I) | 8 | D-1 (I) | 2 | Maleic anhydride | 0.08 | 0.04 | 42 | 420 | 130 | 122 | 0.8 |
| 5 | A-2 (I) | 27 | B-1 (2) | 63 | C-4 (I) | 8 | D-1 (I) | 2 | Maleic anhydride | 0.08 | 0.04 | 34 | 340 | 113 | 150 | 0.8 |
| 6 | A-2 (I) | 27.6 | B-1 (2) | 65.4 | C-3 (I) | 5 | D-1 (I) | 2 | Maleic anhydride | 0.08 | 0.04 | 30 | 320 | 122 | 157 | 0.8 |
| 7 | A-2 (I) | 27 | B-1 (2) | 63 | C-3 (I) | 8 | D-1 (I) | 2 | Acrylic acid | 0.08 | 0.04 | 32 | 320 | 126 | 146 | 0.9 |
| 8 | A-2 (I) | 27 | B-1 (2) | 63 | C-3 (I) | 8 | D-1 (I) | 2 | Maleic anhydride | 0.24 | 0.04 | 44 | 440 | 96 | 148 | 0.75 |
| 9 | A-2 (I) | 24.9 | B-1 (2) | 58.1 | C-3 (I) | 15 | D-1 (I) | 2 | Maleic anhydride | 0.15 | 0.04 | 62 | 520 | 73 | 132 | 0.75 |
| 10 | A-2 (I) | 24.6 | B-1 (2) | 57.4 | C-3 (I) | 8 | D-1 (I) | 10 | Maleic anhydride | 0.08 | 0.04 | 37 | 350 | 108 | 150 | 0.8 |
| 11 | A-2 (I) | 27 | B-1 (1) | 63 | C-3 (I) | 8 | D-1 (I) | 2 | Maleic anhydride | 0.08 | 0.04 | 37 | 240 | 110 | 138 | 2.8 |
| 12 | A-2 (I) | 27 | B-1 (2) | 85 | C-3 (I) | 8 | D-2 (I) | 2 | Maleic anhydride | 0.08 | 0.04 | 34 | 310 | 95 | 145 | 0.8 |
| 13 | A-2 (I) | 5 | B-1 (2) | 85 | C-3 (I) | 8 | D-1 (I) | 2 | Maleic anhydride | 0.08 | 0.04 | 48 | 520 | 260 | 92 | 1.8 |
| 14 | A-2 (I) | 85 | B-1 (2) | 5 | C-3 (I) | 8 | D-1 (I) | 2 | Maleic anhydride | 0.08 | 0.04 | 18 | 190 | 12 | 188 | 1.3 |
| 15 | A-2 (I) | 45 | B-1 (2) | 13 | C-3 (I) | 40 | D-1 (I) | 2 | Maleic anhydride | 0.08 | 0.04 | 102 | 560 | 18 | 146 | 1.1 |
| 16 | A-2 (I) | 45 | B-1 (2) | 50 | C-3 (I) | 3 | D-1 (I) | 2 | Maleic anhydride | 0.08 | 0.04 | 26 | 380 | 72 | 163 | 0.7 |
| 17 | A-2 (I) | 27.6 | B-1 (2) | 64.4 | C-3 (I) | 8 | D-1 (I) | — | Maleic anhydride | 0.08 | 0.04 | 24 | 160 | 94 | 128 | 2.4 |
| 18 | A-2 (I) | 36 | B-2 (2) | 54 | C-3 (I) | 8 | D-1 (I) | 2 | Maleic anhydride | 0.08 | 0.04 | 32 | 240 | 105 | 178 | 0.8 |
| 19 | A-2 (I) | 27 | B-1 (2) | 63 | C-4 (I) | 8 | D-1 (I) | 2 | Maleic anhydride | 0.08 | 0.04 | 22 | 260 | 124 | 148 | 0.8 |
| 20 | A-2 (I) | 27 | B-1 (2) | 63 | C-3 (I) | 8 | D-1 (I) | 2 | Hydroxyethyl acrylate | 0.08 | 0.04 | 28 | 280 | 116 | 142 | 0.8 |
| 21 | A-2 (I) | 27 | B-1 (2) | 63 | C-3 (I) | 8 | D-1 (I) | 2 | Allyl glycidyl ether | 0.08 | 0.04 | 24 | 230 | 118 | 142 | 0.9 |
| 22 | A-2 (I) | 27 | B-1 (2) | 63 | C-3 (I) | 8 | D-1 (I) | 2 | Acrylamide | 0.08 | 0.04 | 22 | 230 | 118 | 140 | 0.9 |
| 23 | A-2 (I) | 27 | B-1 (2) | 63 | C-3 (I) | 8 | D-1 (I) | 2 | Acrylic acid | 0.08 | 0.04 | 30 | 300 | 100 | 144 | 0.9 |
| 24 | A-2 (I) | 27.6 | B-1 (2) | 64.4 | C-3 (I) | 8 | — | — | Acrylamide | 0.08 | 0.04 | 24 | 140 | 102 | 124 | 0.8 |
| 25 | A-2 (I) | 27.6 | B-1 (2) | 64.4 | C-3 (I) | 8 | — | — | Hydroxyethyl acrylate | 0.08 | 0.04 | 18 | 120 | 94 | 123 | 0.8 |
| 26 | A-2 (I) | 27.6 | B-1 (2) | 64.4 | C-3 (I) | 8 | — | — | Allyl glycidyl ether | 0.08 | 0.04 | 15 | 120 | 92 | 123 | 0.9 |
| 27 | A-2 (I) | 27.6 | B-1 (2) | 64.4 | C-3 (I) | 8 | — | — | Acrylamide | 0.08 | 0.04 | 15 | 120 | 92 | 121 | 0.9 |
| 28 | A-2 (I) | 27.6 | B-1 (2) | 64.4 | C-3 (I) | 8 | D-1 (I) | 2 | Maleic anhydride | 0.08 | 0.04 | 20 | 120 | 92 | 125 | 0.8 |
| 29 | A-2 (I) | 18.6 | B-1 (2) | 43.3 | C-3 (I) | 8 | D-1 (I) | 30 | Maleic anhydride | 0.08 | 0.04 | 30 | 340 | 158 | 121 | 0.7 |
| 30 | A-2 (I) | 14.1 | B-1 (2) | 32.9 | C-3 (I) | 8 | D-1 (I) | 45 | Maleic anhydride | 0.08 | 0.04 | 24 | 240 | 172 | 113 | 0.6 |
| 31 | A-2 (I) | 21.2 | Nylon 4,6 (2) | 47.7 | C-3 (I) | 2 | D-1 (I) / D-3 (I) / D-5 (I) | 2 / 15 / 12.1 | Maleic anhydride | 0.08 | 0.04 | 26 | 220 | 132 | 130 | 0.8 |
| 32 | A-2 (I) | 21.2 | Nylon 4,6 (2) | 47.7 | C-3 (I) | 2 | D-1 (I) / D-4 (I) / D-5 (I) | 2 / 20 / 7.1 | Maleic anhydride | 0.08 | 0.04 | 28 | 220 | 128 | 131 | 0.8 |
| 33 | A-2 (I) | 32.4 | Nylon 4,6 (2) | 48.6 | C-3 (I) | 2 | D-1 (I) / D-3 (I) | 2 / 15 | Maleic anhydride | 0.08 | 0.04 | 32 | 240 | 110 | 176 | 0.8 |
| Comparative Example | | | | | | | | | | | | | | | |

TABLE 1-continued

| Example | Proportions of starting polymers used (parts) | | | | | | | Type and amount (%) of functional group-containing unsaturated compound used | Amount (%) of peroxide used | Evaluation results | | | | Weight-average particle diameter ($\bar{R}$) of dispersed particles (μm) |
| --- | --- | --- | --- | --- | --- | --- | --- | --- | --- | --- | --- | --- | --- | --- |
| | Component (a) | | Component (b) | | Component (c) | | Component (d) | | | Izod impact strength (kg·cm/cm) | Falling dart impact strength (kg·cm) | Process-ability (g/10 min) | Heat resistance (°C.) | |
| | Type | Amount (part) | Type | Amount (part) | Type | Amount (part) | Type | Amount (part) | | | | | | |
| 1 | A-2 (1) | 27 | B-1 (2) | 63 | C-1 (1) | 8 | D-1 (1) | 2 | — | — | 28 | 180 | 92 | 144 | 0.9 |
| 2 | A-2 (1) | 27 | B-1 (2) | 63 | C-2 (1) | 8 | D-1 (1) | 2 | — | — | 58 | 220 | 62 | 144 | 0.8 |
| 3 | A-2 | 100 | — | — | — | — | — | — | — | — | 5 | 10 | 0 | 195 | — |
| 4 | — | — | — | 100 | — | — | — | — | — | — | 5 | 280 | 320 | 77 | — |
| 5 | A-2 (1) | 27 | B-1 (2) | 63 | C-3 (1) | 8 | D-1 (1) | 2 | Maleic anhydride 0.08 | 0.04 | 5 | 20 | 120 | 128 | 7.8 |
| 6 | A-2 (1) | 29.4 | B-1 (2) | 68.6 | — | — | D-1 (1) | 2 | Maleic anhydride 0.08 | 0.04 | 6 | 30 | 160 | 148 | 0.8 |
| 7 | A-2 (1) | 2 | B-1 (2) | 88 | C-3 (1) | 8 | D-1 (1) | 2 | Maleic anhydride 0.08 | 0.04 | 86 | 520 | 147 | 72 | 2.2 |
| 8 | A-2 (1) | 88 | B-1 (2) | 2 | C-3 (1) | 8 | D-1 (1) | 2 | Maleic anhydride 0.04 | — | 18 | 110 | 0 | 188 | 0.5 |
| 9 | A-2 (1) | 27 | B-1 (2) | 63 | C-3 (1) | 8 | D-1 (1) | 2 | — | — | 24 | 80 | 112 | 132 | 4.7 |
| 10 | A-2 (1) | 27.6 | B-1 (2) | 64.4 | C-2 (1) | 8 | — | — | — | — | 22 | 40 | 32 | 112 | 3.4 |
| 11 | A-2 (1) | 27 | B-1 (2) | 63 | C-3 (1) | 8 | D-1 (1) | 2 | Maleic anhydride 0.08 | 0.04 | 5 | 30 | 38 | 86 | 7.6 |

Note:
*"A-1 (1)" means that the A-1 component was added in 1st step. "B-1 (2)" means that the B-1 component was added in 2nd step. The test sample in Comparative Example 11 was prepared in the same manner as in Example 1, except that no kneading zone was employed and mixing of components was conducted only by the action of the feed screw of extruder.

What is claimed is:

1. A thermoplastic resin composition obtained by first melt-mixing the following (a), (c) and (d) components in the presence of the following (e) component and (f) a peroxide, and then melt-mixing the following (b) component therewith:
   (a) 4 to 95% by weight of a polyphenylene ether resin,
   (b) 4-95% by weight of a polyamide,
   (c) 1-50% by weight of a rubbery polymer selected from the group consisting of polybutadiene, styrene-butadiene random copolymers, styrene-isoprene copolymers, acrylonitrile-butadiene copolymers, ethylene-α-olefin copolymers, ethylene-α-olefin-polyene copolymers, acrylic rubbers, polyisoprene, styrene-butadiene butadiene block copolymers, styrene-isoprene block copolymers, hydrogenated styrene-butadiene block copolymers, styrene-grafted ethylene-propylene elastomers and ethylenic ionomer resins, and
   (d) 91% by weight or less of a styrene resin selected from the group consisting of polystyrene, styrene-unsaturated acid copolymers, styrene-epoxy group-containing unsaturated compound copolymers, styrene-acid anhydride group-containing unsaturated compound copolymers, styrene-alkali (meth)acrylate copolymers, styrene-alkenyl cyanide compound copolymers, styrene-maleimide compound copolymers, styrene-amino group-containing ethylenically unsaturated compound copolymers and styrene-hydroxyl group-containing unsaturated compound copolymers,
   wherein the sum of the (a), (b), (c) and (d) components is 100% by weight;
   (e) 0.001–10% by weight based on the total weight of the (a), (b), (c) and (d) components, of at least one monomeric functional group-containing unsaturated compound having at least one group selected from the group consisting of carboxyl, acid anhydride, epoxy, hydroxy, amino and amido groups;
   the amount of the (f) component being 0.001–5% by weight based on the total weight of the (a), (b), (c) and (d) comoonents.

2. A thermoplastic resin composition according to claim 1, wherein at least one of the (a), (b) and (c) components is dispersed in the composition and the dispersed particles have a weight-average particle diameter of 5 μm or less.

3. A thermoplastic resin composition according to claim 1, wherein the functional group-containing unsaturated compound is selected from the class consisting of unsaturated carboxylic acids; unsaturated carboxylic anhydrides; unsaturated glycidyl esters, unsaturated glycidyl esters, epoxyalkenes and p-glycidylstyrenes representedby the formulas:

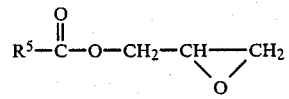

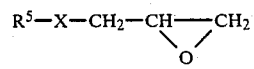

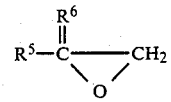

wherein $R^5$ is a $C_{2-18}$ hydrocarbon group having an ethylenic unsaturation; $R^6$ is a hydrogen atom or a methyl group; and X is $-CH_2-O-$,

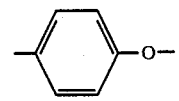

or;

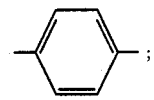

alcohols having a double bond; alcohols having a triple bond; esters of an unsaturated mono- or dicarboxylic acid with an unsubstituted dihydric alcohol, an unsubstituted trihydric alcohol, an unsubstituted tetrahydric alcohol or an unsubstituted penta- or higher-hydric alcohol; and alkenyl compounds having at least one group selected from the amino, substituted amino, amido and substituted amido groups represented by the formula:

wherein $R^7$ is a hydrogen atom, a methyl group or an ethyl group; and $R^8$ is a hydrogen atom, an alkyl group having 1 to 12 carbon atoms, an alkanoyl group having 2 to 12 carbon atoms, an aryl group having 6 to 12 carbon atoms, a cycloalkyl group having 6 to 12 carbon atoms or a derivative group thereof.

4. A thermoplastic resin composition according to claim 1, wherein the functional group-containing unsaturated compound is at least one compound selected from the class consisting of unsaturated carboxylic acids and unsaturated carboxylic anhydrides.

5. A thermoplastic resin composition according to claim 1, wherein the functional group-containing unsaturated compound is an unsaturated carboxylic anhydride.

6. A thermoplastic resin composition according to claim 4, wherein the unsaturated carboxylic acid is selected from the class consisting of acrylic acid, methacrylic acid, crotonic acid, cinnamic acid, itaconic acid and maleic acid, and the unsaturated carboxylic anhydride is selected from the class consisting of maleic anhydride, itaconic anhydride, chloromaleic anhydride, citraconic anhydride, butenylsuccinic anhydride and tetrahydrophthalic anhydride.

7. A thermoplastic resin composition according to claim 1, wherein the functional group-containing unsaturated compound is acrylic acid, methacrylic acid or maleic anhydride.

8. A thermoplastic resin composition according to claim 5, wherein the unsaturated carboxylic anhydride is maleic anhydride.

9. A thermoplastic resin composition according to claim 1, wherein the amount of the functional group-containing unsaturated compound is 0.005 to 5% by weight.

10. A thermoplastic resin composition according to claim 1, wherein the peroxide is at least one organic peroxide selected from the class consisting of 2,5-dimethyl-2,5-di(tert-butylperoxy)hexyne-3, 2,5-dimethyl-2,5-di(tert-butylperoxy)hexane, 2,2′-bis(tert-butylperoxy)p-diisopropylbenzenedicumyl peroxide, di-tert-butyl peroxide, tert-butyl peroxybenzoate, 1,1-bis(tert-butylperoxy)-3,3,5-trimethylcyclohexane, 2,4-dichlorobenzoyl peroxide, benzoyl peroxide, and p-chlorobenzoyl peroxide.

11. A thermoplastic resin composition according to claim 10, wherein the organic peroxide is 2,5-dimethyl-2,5-di(tert-butylperoxy)hexane or 2,5-di(tert-butylperoxy)hexyne-3.

12. A thermoplastic resin composition according to claim 1, wherein the amount of the peroxide is 0.005 to 2% by weight.

13. A thermoplastic resin composition according to claim 1, wherein the amount of the (a) component is 5 to 50% by weight and the amount of the (b) component is 40 to 90% by weight.

14. A thermoplastic resin composition according to claim 1, wherein the amount of the (d) component is 1 to 50% by weight.

15. A thermoplastic resin composition according to claim 2, wherein the component dispersed in the composition is the (a) component.

16. A thermoplastic resin composition according to claim 1, wherein the melt-mixing is conducted by a twin-screw extruder at 200° to 350° C.

17. A thermoplastic resin composition according to claim 2, wherein the diameter of the dispersed particles is 3 μm or less.

18. A thermoplastic resin composition according to claim 1, wherein the polyphenylene ether resin (a) is a polymer represented by the formula:

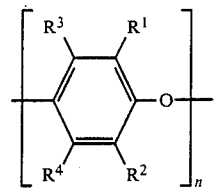

wherein $R^1$, $R^2$, $R^3$ and $R^4$, which may be the same or different, represent alkyl groups, aryl groups, halogen atoms or hydrogen atoms; and n is degree of polymerization.

19. A thermoplastic resin composition according to claim 1, wherein the polyamide as the (b) component is at least one polyamide selected from the class consisting of condensation products of a linear diamine represented by the formula:

$$H_2N-(CH_2)_x-NH_2$$

wherein x is an integer of 4 to 12 with a linear dicarboxylic acid represented by the formula:

$$HO_2C-(CH_2)_y-CO_2H$$

wherein y is an integer of 2 to 12; polyamides formed by the ring opening polymerization of a lactam; semi-aromatic polyamides formed from m-xylenediamine and the above linear dicarboxylic acid; and polyesteramides.

20. A thermoplastic resin composition according to claim 1, wherein the rubbery polymer as the (c) component is at least one rubbery polymer selected from the class consisting of polybutadiene, ethylene-α-olefin copolymers, ethylene-α-olefin-polyene copolymers, styrene-butadiene block copolymers and hydrogenated styrene-butadiene block copolymers.

21. A thermoplastic resin composition according to claim 19, wherein the rubbery polymer as the (c) component is selected from the class consisting of polybutadienes, styrene-butadiene random copolymers, ethylene-alpha-olefin copolymers and styrene-butadiene block copolymers.

22. A thermoplastic resin composition according to claim 1, wherein the styrene resin (d) is a styrene-glycidyl methacrylate copolymer or a styrene-acrylic acid copolymer.

* * * * *